June 16, 1959 L. S. C. KANG 2,890,665
PLANTING MACHINE
Filed Jan. 30, 1956 5 Sheets-Sheet 1

INVENTOR.
LAWRENCE S.C. KANG
BY Stewart & Stewart
ATTORNEYS

June 16, 1959 — L. S. C. KANG — 2,890,665
PLANTING MACHINE
Filed Jan. 30, 1956 — 5 Sheets-Sheet 3

INVENTOR.
LAWRENCE S. C. KANG
BY
Steward + Steward
ATTORNEYS

June 16, 1959   L. S. C. KANG   2,890,665
PLANTING MACHINE

Filed Jan. 30, 1956   5 Sheets-Sheet 4

INVENTOR.
LAWRENCE S.C. KANG
BY
*Steward + Steward*
ATTORNEYS

INVENTOR
LAWRENCE S.C. KANG
BY
ATTORNEYS

United States Patent Office 2,890,665
Patented June 16, 1959

2,890,665
PLANTING MACHINE

Lawrence S. C. Kang, Honolulu, Territory of Hawaii

Application January 30, 1956, Serial No. 562,185

13 Claims. (Cl. 111—3)

This invention relates to planting young plants; and it relates more particularly to methods of and apparatus for planting crops, such as pineapple slips, suckers and crowns, wherein sheets of thin material are laid on the ground and the plants grow through apertures provided therein. Since the invention has particular application in the planting of pineapples, reference is made throughout the specification to pineapple planting, but it should be understood that the invention may also be useful in planting other crops, such as sugar cane, celery, tomato plants and the like.

This application is a continuation-in-part of my copending application Ser. No. 543,458, filed October 28, 1955, and now abandoned.

In pineapple planting, after a field is first prepared and made ready for planting by plowing and harrowing, fertilizers and fumigants are applied to the ground and mulch paper is laid in strips across the field, forming rows of planting beds. Usually the mulch paper is laid at the same time that the fumigant is injected into the topsoil. The conventional mulch paper is similar in appearance to tar roofing paper and helps to prevent growth of weeds, conserves moisture, fertilizers and fumigants, and increases soil temperature. As the mulch paper is laid by paying it out from a roll mounted on a power drawn vehicle, both edges of the paper are covered with soil to hold it down and to help retain the fumigants, the operations of injecting the fumigant, unrolling and laying the mulch paper and covering its edges being carried out by suitable apparatus drawn by a tractor. In order to avoid rapid dissipation of the fumigant through holes in the mulch paper before the fumigant can take effect, it has usually been the practice not to plant the pineapple slips for several days after the paper has been laid.

For many years, pineapple plants have been manually planted by field workers, but recently various attempts have been made to plant them with machines some of which are designed to try to duplicate as nearly as possible the procedure followed during hand planting, i.e. by punching a hole through the previously laid mulch paper and then inserting a plant into the ground through the hole. Machines have been developed which perforate the mulch paper before it is laid along a furrow in the ground and provide means for filling in the soil around the base of a plant as it is inserted by hand through the holes in the mulch paper into the ground.

Where the fields are planted by hand, the pineapple slips are hauled to the planting fields and scattered along the rows of mulch paper. The field worker or planter picks up a slip with one hand, punches a hole with the other hand through the mulch paper at predetermined points marked in the paper, using a narrow trowel or small spade. He then inserts the slip through the punctured hole in the mulch paper and into the depression which he has made in the ground with the trowel and withdraws the trowel in such a way as to let the soil pack around the base of the plant so that it will be held upright, the whole planting operation being done by the planter in a bent-over posture. While still bent over, the planter then moves to the next mark on the paper and plants another slip in the same manner.

Many of the plants set or planted in this manner are either left standing precariously so that they have a tendency to later topple over, or may be planted too shallow or too deep. The mulch paper around the base or butt end of the pineapple plant becomes torn and somewhat multilated permitting weeds to grow through the torn places. The weeds must later be removed by hand or by chemical sprays since the use of a hoe or tool is apt to further tear the mulch paper and knock over other properly set plants. Furthermore, the torn areas of the mulch paper will permit soil moisture to evaporate and soil temperature to be lowered, so that the full benefit of the mulch paper is not obtained.

Field workers for planting pineapple plants are among the highest paid manual laborers in the industry, and it is one of the toughest and most tedious jobs as the planters are bent over and working close to the ground where it is dusty and hot when dry, and muddy and sticky when wet. Consequently, as time goes on, the pineapple industry is finding it increasingly difficult to find men to perform this tedious, strenuous, and unpleasant work.

Hand planting of pineapple plants is, nevertheless, still being practiced today chiefly because mechanical planting machines devised heretofore have several objectionable disadvantages, such as being too slow in operation, having a tendency to injure the plants during planting operations, increasing rather than decreasing operational costs, and being too complicated and costly to manufacture. Moreover, some of these prior machines still do not eliminate the back-breaking task of the planter who must still bend over or sit in an uncomfortably awkward position in order to place the plants through the mulch paper into the ground.

It is a primary object of this invention to overcome the disadvantages of planting by hand as well as to overcome those of prior planting machines of which I am aware. A specific object of the invention is to provide a relatively simple and inexpensive planting machine which is capable of saving time, labor and money and which is more efficient, economical and practical to operate than planting machines devised heretofore. Another object is to provide a planting method and apparatus which combines into one continuous operation the separate steps of fumigating, laying a mulch paper on the ground, and planting. It is also desired to reduce to a minimum the amount of dissipation of the fumigant from the soil, the growth of weeds and loss of moisture in the soil, as well as lowering of the soil temperature, by making the mulch paper fit tightly around the plants and by avoiding tearing of the mulch paper so that planting can take place at the same time that the fumigant is injected into the soil and the mulch paper laid.

A further object of the invention is to set and maintain the plants securely in an upright position and at a uniform, predetermined depth in order to reduce the number of retarded plants due to improper planting depth and positioning of the plant in the ground. The plants should, moreover, be uniformly spaced one from another in single or multiple rows or beds. Another object is to provide a method of and apparatus for planting which is capable of handling all types and sizes of pineapple or like plants.

Still further objects of my invention are to provide a new and improved method of and means for planting pineapple plants which will contribute to an earlier start during the planting season and promote better growth and greater yield than methods heretofore practiced, yet can be readily adapted for use with most pineapple field planting equipment while operating successfully regardless of variations in the terrain or planting beds over which the machine is drawn.

Another object of my invention is to provide new and improved means for replacing and packing soil around the plant base or butt beneath the mulch board or paper as the latter is being laid upon the ground.

These and other objects of the invention, as well as novel features and advantages, will become apparent from the description hereinafter.

From my knowledge and observations of prior pineapple planting machines I attribute their failure to supplant hand planting methods and procedures to the fact that such prior art machines have resulted from endeavors to try to follow the procedures and methods used for hand planting. I have departed, however, rather drastically from the conventional methods used heretofore in planting both by hand and by machine, in that I propose to eliminate the strenuous, back-breaking and toilsome work of inserting the plants directly into the ground. Thus, my novel method comprises feeding a sheet of relatively thin material (most conveniently the mulch paper used prior to planting pineapple and other crops) onto the ground from a supply thereof carried on a moving vehicle, while maintaining the speed at which the vehicle travels equal to the rate at which the sheet material is fed onto the ground and, at a plant pre-setting station on the vehicle above the ground, inserting and locking the young plants in the sheet material as it passes said station so that the plants are held by the planting sheet as it is lowered to and laid on the ground with the bases of the plants extending downwardly into the soil.

Another aspect of the invention is in apparatus for planting young plants which provides means for carrying a suitable supply of the planting sheet material, most desirably in continuous lengths such as rolls on a moving vehicle, from which supply the planting sheet is paid out onto the ground as the moving vehicle is drawn across the field being planted; and which provides means on the moving vehicle for supporting the planting sheet above the ground and with its lateral dimension substantially parallel thereto, whereby the plants may be inserted downwardly substantially perpendicularly through, and locked into the planting sheet so that they are gripped by it; said planting sheet then carrying the plants to the ground where the lower portions of the plants are inserted into the soil as the planting sheet is discharged from the vehicle. If, as in the case of pineapple planting, it is desired for practical reasons to use as the planting sheet the relatively thin mulch paper presently available, it has been found necessary to provide the machine with mulch paper supporting means which will travel wih the paper and prevent it from collapsing, ripping or tearing as the pineapple slips are inserted into it. On the other hand, where it is feasible to do so, the planting sheet may consist of a corrugated paper board which is stiff enough to withstand the pressure of inserting the plants, in which case the machine can be still further simplified by eliminating the traveling paper supporting mechanism. Moreover, the corrugated board enhances the growth of the plants by providing heat insulating air spaces between the plies of the board which serve to prevent temperature fluctuations in the soil.

An important advantage of my invention is that it provides means for setting and locking the base or butt ends of the plants in an upright position within apertures formed in the planting sheet or mulch paper on a conveniently located platform or deck spaced above the ground before the mulch paper is laid on the ground. The workers can, therefore, insert plants in the mulch paper at a convenient level before the paper is actually laid on the ground, thereby rendering a difficult task relatively simple.

Apparatus which is suitable for use in planting pineapple plants in accordance with my invention, is illustrated by way of example in the accompanying drawings, in which.

Referring now to the drawings in detail, and more particularly to Figs. 1 to 13, the apparatus shown for illustrative purposes is designed to plant two rows of pineapple plants at a time and is intended to be drawn across the planting field in any suitable manner, such as for example, by a power operated tractor or other power source not shown. However, it is to be clearly understood that my planting machine may be designed to plant a larger or smaller number of rows without departing from the invention. As will become more apparent hereinafter, the apparatus shown in Figs. 1 to 6 is designed more especially for handling a semi-rigid mulch board such as corrugated paper board. A two-ply board having one of the plies flat and the other corrugated as shown in Fig. 9 is desirable, as this is more readily furnished in rolls from which the board can be conveniently paid out and laid on the ground.

Figure 2:
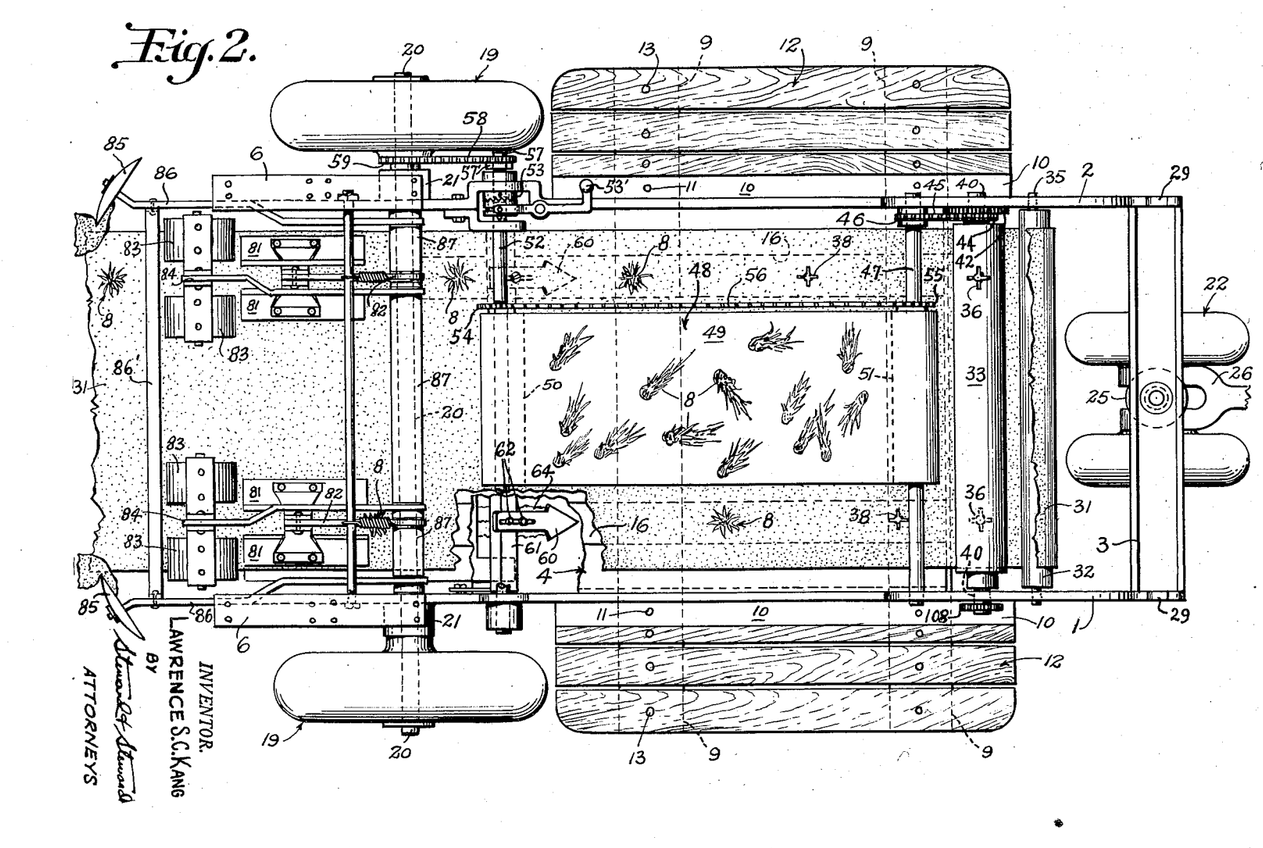
Fig. 2 is a plan view of the machine shown in Fig. 1 with the pineapple plant hopper removed and portions broken away in order to show certain parts of the apparatus more clearly.

The framework for my new planting machine comprises a pair of elongated spaced side plates or frame members 1 and 2 which are joined to one another throughout their length by various cross members such as the front cross member 3, deck member 4, and rear cross members 5, the last being removed in Fig. 2 in order that the apparatus under it may be seen more readily. The rear cross members 5 are rigidly attached to the outwardly extending flanges 6 formed integral with the side plates 1 and 2 as best shown in Figs. 2 and 4. The cross members 5 support a hopper 7 for pineapple plants indicated by reference numeral 8. Cross members, such as channel irons 9, are rigidly connected beneath the outwardly projecting flanges 10 of the side plates or frame members 1 and 2 by bolts or rivets 11 (Fig. 3) and project outwardly beyond the side plates to support the planks of platforms 12 which are secured thereto by bolts or rivets 13. The platforms 12 are for the planters to stand on during the planting operations as will be more fully explained hereinafter.

Figures 6, 7, 7A, 9:
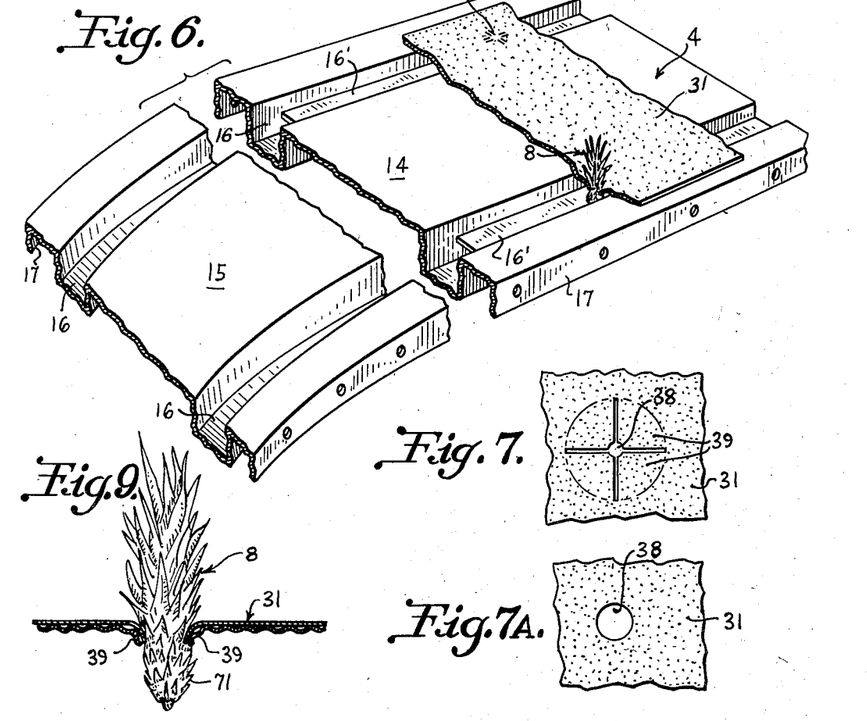
Fig. 6 is a fragmentary detail perspective of the mulch paper supporting deck, partly in section and showing a portion of the mulch board or paper with a plant locked into one of the plant receiving apertures.
Figs. 7, 7A and 8 are fragmentary details illustrating different types of locking perforations or plant receiving apertures which may be made in the mulch board or paper by the perforating drums or rollers to accommodate the plants as they are set in the mulch paper before it is laid on the ground.
Fig. 9 is a detail view, partly in cross section, showing a pineapple plant locked into one of the locking perforations made in the much board or paper by the perforating drums.

The deck member 4 may be made from sheet metal or other suitable material and, as clearly illustrated in Fig. 6, comprises a substantially horizontal portion indicated at 14 and a rearwardly sloping portion indicated at 15. Spaced plant receiving troughs 16 extend longitudinally of the deck 4 and the longitudinal outer edges of the deck are bent downwardly to form attaching flanges 17. These flanges are preferably secured to the inner faces of the side frames 1 and 2 by bolts or rivets 18.

The rear portion of the frame is supported by wheels 19 journaled on the rear axle 20, the axle in turn being rigidly mounted in bosses 21 (Fig. 5) which are welded or otherwise secured to the side frames 1 and 2 so as to project outwardly thereof. The forward end of the machine framework is supported by a pair of front caster wheels 22 which are journaled on a horizontal shaft or axle 23 carried by a vertical swivel member 24 between wheels 22. The upper end of the swivel member 24 is rotatably journaled in a bearing 25 mounted on front cross member 3, and suitable draft means, such as the U-shaped tongue 26, is pivotally connected to the shaft 23. The rear wheels 19 are spaced outwardly beyond the plant receiving trough 16 of the deck 4 while the front caster wheels 22 are preferably located between said troughs as clearly illustrated in Fig. 2.

Figures 1, 12, 13:
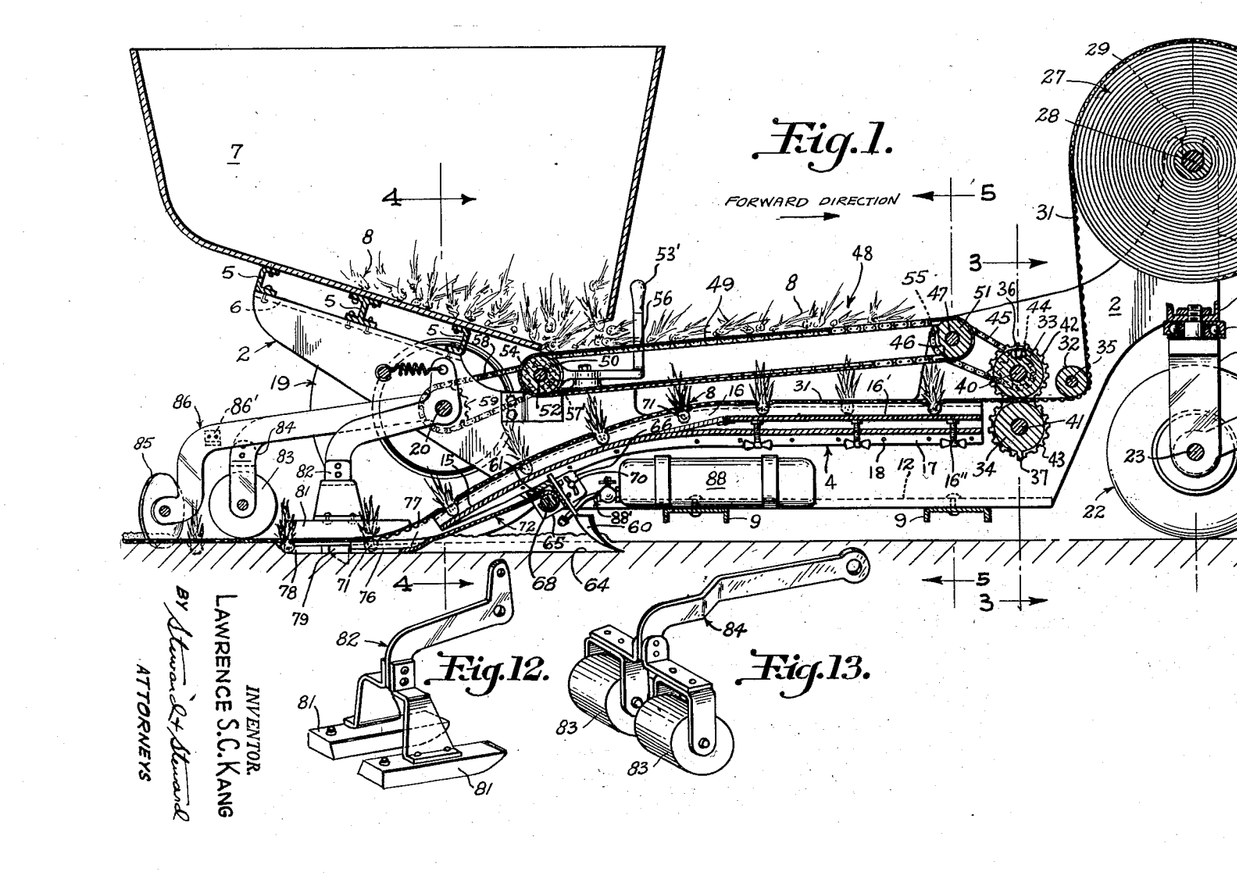
Fig. 1 is a right side elevational view, partly in vertical section, of a planting machine for pineapple plants embodying certain features of the present invention.
Fig. 12 is a detailed perspective view of one set of the floating or yieldable planting pontoons.
Fig. 13 is a detailed perspective view of one set of the floating soil packing rollers.

A supply roll 27 of mulch board or paper is rotatably carried on a horizontal shaft 28, the ends of which are removably received in slots 29 formed in the vertical forward legs 30 of the side frames 1 and 2 as best shown in Fig. 1. It will be noted that in Fig. 2 the roll 27 of mulch paper has been removed so that the parts below it can be seen more readily. Before the planting operation is started, the free end of the mulch board or paper is fed through the perforating means to be described hereinafter, over the deck 4 and onto the ground where it is securely fastened or staked to the ground at one end of a bed to be planted. The machine is then drawn forward across the field paying out the strip or web of mulch board or paper 31 as it goes.

As the mulch paper is drawn from the supply roll 27 it passes around an elongated idler roller 32 and then between perforating drums or rollers 33 and 34. The idler roller 32 is rotatably journaled on a cross shaft 35 supported in the frame plates 1 and 2 and forward of the perforating drums 33 and 34. The upper perforating drum 33 carries two female cutting dies 36 (Fig. 3) and the lower perforating drum 34 carries two male cutting dies 37 which cooperate with one another to punch plant receiving apertures 38 in the mulch web or sheet 31 when the perforating drums are rotated in timed relation with the speed at which the planting machine travels along the ground as it is drawn across the planting field. The male and female dies are positioned along the length of the perforating drums so that they are aligned with the plant receiving troughs 16 and are displaced 180° circumferentially of their respective drums so that the plant receiving and locking apertures 38, punched in the mulch paper 31 in rows directly over the troughs 16, are staggered as clearly shown in Fig. 2. The cutting dies may be designed to punch different types, sizes and shapes of plant locking apertures 38 but an important feature of the apertures resides in the forming of plant locking tongues or flares 39 (Fig. 9), as will be pointed out hereinafter.

Figure 3:
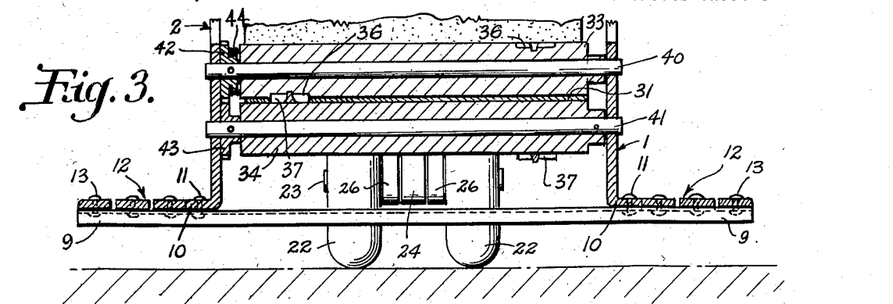
Fig. 3 is a view in transverse vertical section through the mulch board or paper perforating drums or rollers taken substantially along the line 3—3 in Fig. 1.
Figure 4:
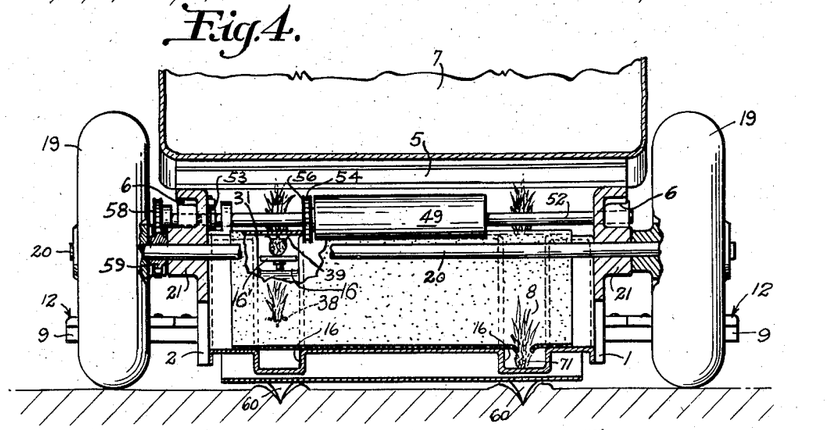
Fig. 4 is a similar view taken substantially along the line 4—4 of Fig. 1.

As shown in Fig. 3 the perforating drums 33 and 34, for punching plant apertures in the mulch paper 31, are fixed to shafts 40 and 41, respectively, the shafts being rotatably journaled in the side frames 1 and 2. A pair of meshed gears 42 and 43 keyed or otherwise secured to the shafts 40, 41, respectively, and just inside the frame plate 2 (Fig. 3) serve to rotate the perforating drums 33, 34 in opposite directions as the mulch paper 31 is drawn rearwardly over the deck 4 when the machine is moved forward across the planting field. Power for rotating the upper perforating drum shaft 40 is provided through the sprocket 44 fast on said shaft 40 between the end of the drum 33 and frame plate 2 (Fig. 3), chain 45, and sprocket wheel 46 fixed to the forward shaft 47 of a driven endless conveyor 48 (Fig. 1).

The plant conveyor 48 serves to feed plants 8 from the open bottom of hopper 7 (when the machine is in motion) forwardly above the deck 4, as may be seen in Fig. 1, and between the two rows of apertures in the mulch paper 31, as shown in Fig. 2. The plants are, therefore, readily accessible and within convenient reach of the planters on the platforms 12. The plant conveyor 48 is shown as comprising an endless belt 49 (Figs. 1 and 5) trained over a pair of drums 50 and 51, the forward drum 51 being fixed to and rotatable with shaft 47. The rear drum 50 of conveyor 48 is fixed on a rotatable shaft 52 which is journaled at one end in side frame 1 and is connected at its other end to a clutch, shown more or less diagrammatically at 53. A sprocket 54 fixed to shaft 52 drives a chain 56 extending along belt 49. Chain 56 in turn drives shaft 47 by means of a sprocket 55 keyed thereto. Shaft 52 is driven through clutch 53 by a stub shaft 57 journaled in side frame 2. The outer end of stub shaft 57 is provided with a sprocket 57' driven by means of a chain 58 and sprocket 59 which is fixed on wheel 19 and rotatable therewith as the machine is moved along the ground. Clutch 53 is provided with a lever 53' for engaging and disengaging shaft 52 from stub shaft 57. Consequently, when the planting machine is drawn in a forward direction, as indicated by the arrow in Fig. 1, rotation of wheel 19, to which the sprocket 59 is attached, will drive the stub shaft 57 which in turn will drive shaft 52 when the clutch 53 is engaged. On the other hand, when it is not desired to drive shaft 52, as when the machine is being hauled to and from a pineapple field, clutch 53 may be readily disengaged by simply moving clutch lever 53', which extends upwardly at the rear end of one of the platforms 12.

Upon engagement of clutch 53 and when the machine is moving, conveyor 48 will be driven to feed plants 8 forwardly from the open bottom of hopper 7 above the horizontal portion 14 of deck 4 where they are in convenient reach of the workers on platforms 12. While the plants 8 are fed from the hopper by conveyor 48, the mulch paper 31 is drawn rearwardly through perforating drums 33, 34, which are driven simultaneously with conveyor 48, and across the deck 4, as may be clearly seen in Fig. 1.

As the mulch paper 31 moves along the deck 4 in front of the workers standing or sitting in seats (not shown) provided on the platforms 12 on both sides of the machine, the workers pick up the plants from the conveyor 48 and insert them in the apertures 38 cut in the mulch paper by the perforator drums. It should be noted that in accordance with my invention, the mulch board or paper functions as a planting means for lowering the plants from a position above the ground and setting them in the soil, in addition to acting merely as a means for mulching. In order to make the plants stand upright in the mulch paper 31 as they are moved down the sloping portion 15 of the deck and as they are laid on the ground, the apertures 38 in the paper are preferably made smaller than the diameter of the base of the plant, thereby forcing the paper to flare out around the stalk of the plant, as shown in Fig. 9, so as to grip it effectively.

Figure 8:
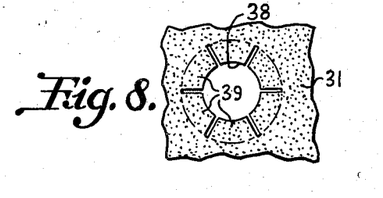

In order to accommodate plants of different sizes, the apertures may be cut in various ways, as indicated in Figs. 7 and 8, to form locking tongues 39 which will grip plants having bases of different diameters. The plant locking apertures may, if desired, simply comprise crossed slits which do not form an actual opening in the paper until a plant is pressed against the paper at the point where the slits intersect. On the other hand, since pineapple plants are at the present time usually planted according to size in order that the plants in a particular field will grow to be about the same size, a plain circular aperture, such as is shown in Fig. 7A, may also be used. The mulch board or paper is tough enough so that it will not usually tear badly as the butt of the plant is forced down through the circular aperture, the edges of which will bend downward forming gripping flares which hold the plant upright. If the mulch paper is thin, however, and has any tendency to tear, means may be provided for supporting the paper while the plants are set in it, as will be explained hereinafter.

As has been mentioned above, it is important to set the plants in the soil at the proper depth for a particular size. Large plants should of course be set deeper than small ones, the proper depth for a particular size plant enhancing the growth of the plant. To this end, the plant receiving troughs 16 in the mulch paper supporting deck 4 may be provided with depth adjusting means extending along the bottom of each trough to determine the depth to which the plants may be inserted through the mulch paper 31 when they are placed in the perforations 38 as the sheet of mulch board or paper travels on the upper or horizontal portion of the deck 4. An elongated plate or false bottom 16' is mounted in the bottom of trough 16 on supporting pins 16" which are threaded through the bottom of the trough 16 and which are suitably connected to the underside of plate 16' to permit them to rotate freely relative thereto. The lower ends of supporting pins 16" are provided with thumb wings or some other convenient means for turning the pins up or down in order to vary the distance of the plate 16' from the mulch paper 31 supported on the flat upper surface of the deck 4. The planting depth can, therefore, be readily adjusted by simply raising or lowering the false bottom 16'.

Figure 10:
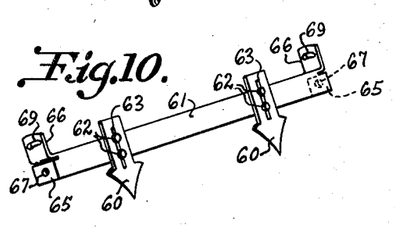
Fig. 10 is a detailed perspective view of the furrow opening plow assembly.

As mentioned hereinbefore the planting machine shown in the drawings is designed for planting two parallel rows of plants 8 and, therefore, a furrow plow 60 is provided adjacent the lower end of each of the troughs 16 in the deck 4. These furrow opening plows are adjustably fastened to a substantially V-shaped cross bar 61 by volts 62 screwed into the cross bar and received by slots 63 in the shank end of the plows (Figs. 2 and 10). By loosening the bolts 62 the plows 60 may be raised or lowered upon the V-shaped cross bar 61 to increase or decrease the depth of the furrows 64 and the adjustment can be maintained by retightening the bolts. The V-shaped cross bar 61 has its ends slotted and bent as shown in Fig. 10 to provide two pairs of ears 65 and 66. Each of the ears 65 has a hole 67 to receive a transverse pivot shaft 68 (Fig. 1) carried by the frame plates 1 and 2, and each of the ears 66 has an arcuate slot 69 to receive a clamping bolt 70, which is screwed into one of the frame plates 1 and 2. By loosening the clamping bolts 70 and rocking the bar 61 counterclockwise, as viewed in Fig. 1, the furrow opening plows 60 may be lifted free of the ground when desired.

Figure 11:
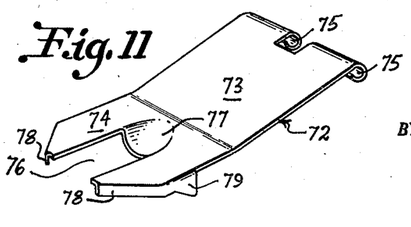
Fig. 11 is a detailed perspective view of one of the covering drags for moving soil into contact and around the plant base or butt end as it is placed in the furrow during the laying of the mulch board or mulch paper.

In order to guide the butt ends 71 of the plants 8 smoothly into the furrows 64 as the plants leave the lower end of the sloping portion 15 of deck 4, and to fill the furrows with the soil indicated at 80 (Fig. 5) around said plant butt ends as they are deposited into the furrows, I provide two covering drags indicated generally by reference numeral 72 in Figs. 1 and 11. Since both covering drags are identical in construction, the description of one will suffice for both. With reference to Fig. 11, each covering drag comprises a plate-like member bent to form a sloping or angular portion 73 and a substantially horizontal portion 74. The upper end of the angular portion 73 is bent or curled over to provide cylindrical sleeves or eyes 75 by which the drags are fastened to the pivot shaft 68 previously referred to. The horizontal portion 74 of each covering drag 72 is provided with a centrally disposed slot 76 and an aligned dished portion 77. The trailing ends of horizontal portion 74, adjacent the slot 76, are cut at an angle and bent downwardly to form narrow converging wall portions 78 and stabilizer fins 79.

As the plants 8 are lowered by the mulch paper 31 along the sloping portion 15 of deck 4, the butt ends are received in dished portion 77 of the covering drag 72 from which the plant is discharged into the furrow 64 in the ground. The converging wall portions 78 then fill the soil in around the butt of the plant which is held in an upright position by the mulch paper with its base embedded in the soil. Stabilizer fins 79 are provided to keep the covering drags from kicking out of position, particularly when the bed being planted is covered, as is often the case.

Since it is important that the plants be set as nearly upright as possible, means are provided for pressing the mulch paper down firmly against the horizontal portion 74 of the covering drags 72, which in turn dig into the soil to ensure proper filling of the furrow around the base of the plant while holding the upper part of the plant up straight. Thus, as the plant bearing mulch paper or strip 31 leaves the sloping surface 15, of deck 4 (Fig. 1), it passes under two pairs of floating pontoons 81, with each pair straddling a row of plants 8 as best shown in Fig. 2. Each pair of pontoons 81 is connected to a curved arm 82 by means of a yoke member shown more clearly in Fig. 12. The upper ends of arms 82 are pivotally secured to the rear axle 20. The forward tapered ends of the pontoons 81 are disposed as close as possible to the trailing edge of the sloping deck surface 15 so as to guide and press the plant bearing sheet 31 against the horizontal portion 74 of the drags 72 and into the ground to align and steady the butt ends 71 of the plants 8 in the furrows 64 while the walled portions 78 of covering drags 72 replace the soil into the furrows. Pontoons 81 may be hollow so that they can be filled with sand or other suitable heavy materials to control their weight depening upon the type of mulch material being laid and the size of plants being planted. If desired, the upper ends of the arms 82 may be spring loaded as shown to further control the pressure exerted by the pontoons against the mulch paper 31.

Immediately following and to the rear of the pontoons 81 and covering drags 72, are two pairs of packing rollers 83, each pair of such rollers straddling its associated row of plants 8 as will be clear from Fig. 2. The pairs of rollers 83 are pivotally connected to the rear axle 20 by suitable pulling tongues 84 and are free to move vertically and independently of one another in the same manner as the pairs of pontoons 81 and covering drags 72 when the planting machine is moving over rough or uneven ground. As may be seen in Figs. 2 and 13, the tongues 84 are bent to one side or the other so that they do not interfere with the arms 82 of pontoons 81. Packing rollers 83 further press the soil around the base of the plants in order to ensure that they are firmly held in position in the ground.

Conventional and well known covering discs 85, for covering the marginal edges of the plant bearing mulch paper 31 after it is laid upon the ground, may be conveniently supported by suitable arms 86, which are likewise pivotally connected to the rear axle 20, as shown best in Figs. 1 and 2. A cross brace 86' is secured at its ends to arms 86 just forward of discs 85 to strengthen these members and keep discs 85 in proper position to cover the outer edges of the mulch paper. Suitable spacers 87 may be inserted upon the rear axle 20 between the ends of the members 82, 84 and 86 which are secured thereto, in order to properly guide the pontoons 81 and rollers 83 with respect to the rows of plants 8 as will be apparent from Fig. 2.

Figure 5:
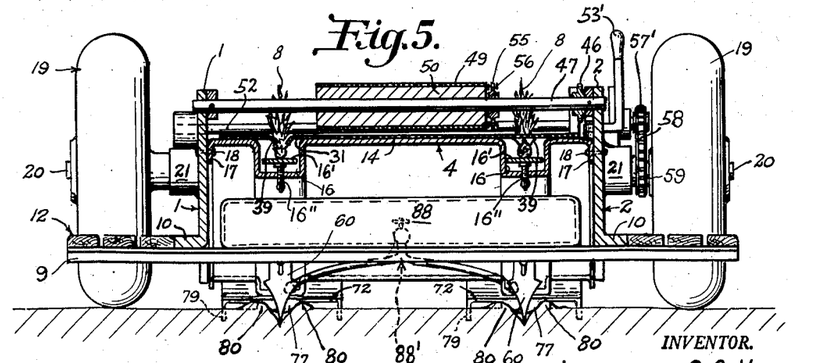
Fig. 5 is another view similar to Fig. 3 but along the line 5—5 of Fig. 1 and looking in the opposite direction.

As stated hereinbefore, it is desirable to apply fumigants to the ground before the mulch sheet or web is laid. To this end I propose to mount a fumigant supply tank 88 beneath the supporting deck 4 and between the frame plates 1 and 2 as shown in Figs. 1 and 5. The fumigants may be conveniently sprayed or otherwise dispensed from the supply tank 88 into each of the furrows preferably at a point between the furrow opening plows 60 and converging drags 72, and just before the plant bearing mulch web 31 is laid upon the ground. As shown generally at 88' in Figs. 1 and 5, fumigant tank 88 is provided with spray nozzles and piping for this purpose, as well as valve means for turning the fumigant on and off.

Through numerous experiments I have discovered that by using a semi-rigid mulch sheet or web 31, such as corrugated board or paper, the plants 8 may be securely locked and held in an upright position when inserted within the apertures 38 in the mulch web 31, at the time of insertion, by the locking tongues or flares 39, as shown in Fig. 9. The plant bearing mulch web or sheet is then lowered to the ground as the planting machine is drawn away from under the mulch web, the plants being set in the ground by the mulch web in the manner just described.

However, in order to use the conventional thin and relatively flexible mulch paper in use today, I have further discovered that it is desirable to provide on the horizontal section 14 of deck 4 auxiliary supporting means for the mulch paper to facilitate proper insertion of the plants, as has been explained generally hereinbefore. It is not ordinarily practical to use the conventional thin flexible mulch paper as a means for planting pineapple plants in the ground in accordance with this invention where the deck 4 is simply provided with open troughs 16, because the mulch paper is apt to collapse into the trough as the plants are inserted into the paper even when the plant receiving apertures 38 are provided. Moreover, the conventional paper is apt to tear when the plant is inserted unless it is adequately supported from below around the point where the plant projects through it.

Figures 14, 17:
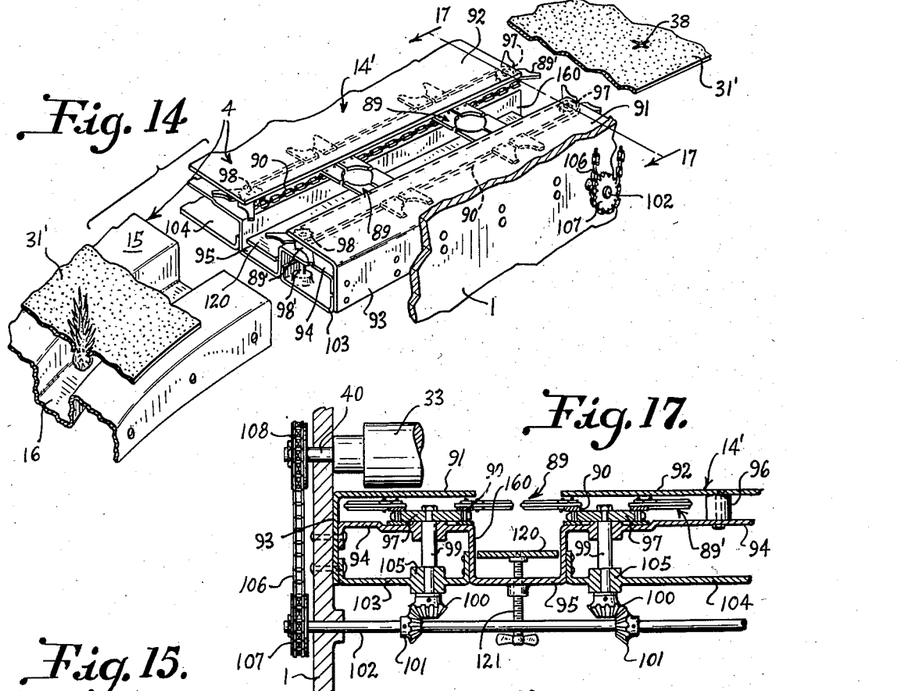
Fig. 14 is a fragmentary perspective view illustrating an auxiliary mulch paper supporting assembly which may be provided on the supporting deck when the conventional relatively thin and flexible mulch paper is used.
Fig. 17 is a view in transverse vertical section taken along the line 17—17 of Fig. 14.

Figs. 14 to 17 show, by way of example, an auxiliary mulch paper supporting mechanism which I have found to be satisfactory when a conventional pineapple mulch paper 31' is used. In place of the horizontal section 14 of deck 4 as shown in the embodiment just described, a section 14' is provided consisting generally of moving auxiliary supporting elements 89, which move rearwardly at spaced intervals along troughs 160 on endless chains 90 extending along opposite sides of each trough 160. Supporting elements 89, as shown more or less diagrammatically in Fig. 14, consist of two pairs of plates 89' secured to chains 90 on opposite sides of trough 160. Each plate 89' is cut away at one corner so that when they are in position in trough 160 they form a circular opening between them, as shown in Fig. 14, through which the butts of the plants will snugly fit. Supporting elements 89 are arranged to coincide exactly with the plant receiving apertures 38 in the mulch paper 31' as the latter is drawn across deck 4, so that when the plants are inserted into the thin, relatively flexible mulch paper it is supported underneath by means of the auxiliary supporting elements 89 which move along deck 4 in timed relation with the mulch paper.

Figs. 14 and 17 show only one side of the horizontal section 14' of the mulch paper supporting deck 4, a single trough 160 being illustrated. It is understood of course that the deck 4 may have any number of similar troughs for planting as many rows of plants as is desirable and practical. As shown in Fig. 14 the sloping portion 15, only a short section of which is indicated for illustrative purposes, is substantially the same as that shown in Fig. 6. Once the plants are properly set in the mulch paper with the aid of the auxiliary supporting elements 89, the conventional thin mulch paper will, particularly if the mulch paper is kept taut, hold the plants properly as it is lowered to the ground.

The deck portion 14' consists of an upper flat side member 91 and a corresponding central horizontal member 92 on the opposite side of trough 160, the members 91 and 92 forming a smooth upper surface over which the mulch paper 31' is drawn. A mounting flange 93 on side member 91 extends downwardly from and at right angles to the upper surface of this member and is fastened by suitable means to the side plate 1 of the frame of the machine. A lower horizontally extending member 94 is disposed below the upper members 91, 92 and is secured along its opposite sides to the mounting flanges 93 of members 91. Member 94 is provided with U-shaped channels 95 which form the bottoms of troughs 160. The central upper member 92 is supported at various points throughout its extent by posts 96 (Fig. 17) secured to the upper side of the lower member 94. Chains 90 are trained around driving sprockets 97 and idler sprockets 98 at opposite ends of the horizontal deck portion 14' and are prevented from sagging in the middle by the upper surface of the lower member 94 on which they are supported. Driving sprockets 97 at the forward end of the supporting deck are keyed to vertical shafts 99 (Fig. 17), which are journaled at their upper ends in the lower member 94 of deck portion 14'. At their lower ends shafts 99 are provided with bevel gears 100 which are fixed thereto and are driven through oppositely facing bevel gears 101 secured to a drive shaft 102. Brace members 103, 104 are secured between the side flanges 93 and the channels 95 of this assembly to provide lower bearings 105 for the shafts 99. Idler sprockets 98 are secured to vertical shafts 98' which are likewise journaled in lower member 94 and brace members 103 and 104.

Drive shaft 102 is journaled at its opposite ends in side frame plates 1 and 2, and is driven in timed relation with the perforating drums 33 and 34 by a chain 106 on a sprocket 107 keyed to an end of shaft 102 which extends outwardly through the side plate 1 of the machine. Chain 106 is driven by a sprocket 108 secured to the outer end of shaft 40 to which drum 33 is keyed. Rotation of drive shaft 102 drives chains 90 so that the supporting plates 89' are carried in pairs around sprockets 97 toward each other into proper relation with respect to each other to form the auxiliary mulch paper supporting elements 89, which then progress rearwardly along trough 160. As each supporting element 89 reaches the rear of the horizontal deck 14', the plates 89' separate permitting the butt of the plant, inserted in the opening between them through the mulch paper 31', to continue with the mulch paper along the trough 16 of the sloping portion 15 of the mulch paper supporting deck 4.

As has been pointed out hereinbefore, the perforating drums 33, 34 are driven in timed relation with the speed of the machine along the ground, and the rate at which the auxiliary mulch paper supporting elements 89 move along the deck 4 is the same as the rate at which the mulch paper is paid out onto the ground so that while the mulch paper is on the horizontal deck portion 14', the supporting elements 89 will remain directly under and travel along with the plant receiving apertures in the paper.

It should be noted, moreover, that the distance between the apertures 38 in the mulch paper in this embodiment of the apparatus must be exactly the same as, for an exact multiple of, the distance between supporting elements 89. This may be arranged by making the circumference of the perforating drums 33, 34 equal to the distance between supporting elements 89 and by rotating the perforating drums at the same speed at which the mulch paper 31' is paid out onto the ground. The supporting elements 89 can then be adjusted by changing the position of these elements in their path of travel with respect to the cutting dies on the perforating drums so that the supporting elements will always coincide with the apertures 38 as it passes over the deck 4. There are numerous ways of doing this, as by shifting the chains 90 on their sprockets, providing adjusting means in the drive for the auxiliary supporting elements between the perforating drum 33 and the chains 90, or by shifting the position of the perforating drums nearer to or farther away from the supporting deck 4. The apertures 38 in the mulch paper 31' and the auxiliary supporting elements 89 are, therefore, synchronized so that the mulch paper is properly supported from below by the elements 89 during insertion of the butt ends of the pineapple plants into the apertures 38.

Figure 15:
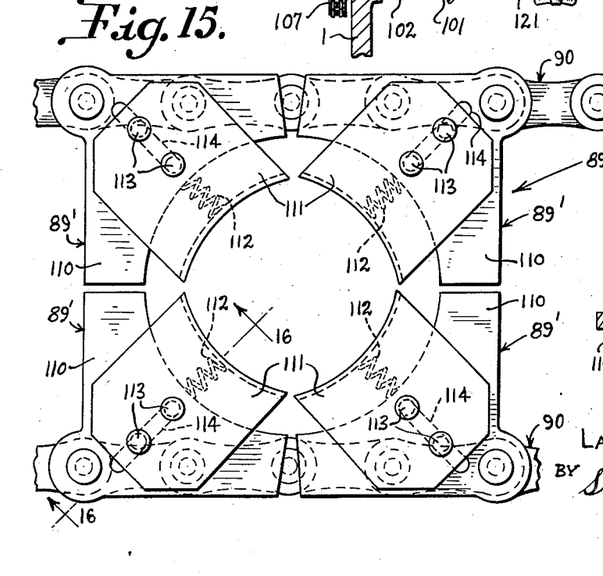
Fig. 15 is an enlarged detail view of one of the yieldable supporting elements shown in Fig. 14.
Figure 16:
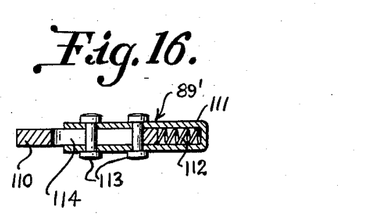
Fig. 16 is a cross sectional view of one of the supporting elements taken along the line 16—16 of Fig. 15.

In order to ensure that the opening formed by the plates 89' of the supporting elements 89 is capable of receiving plants of different sizes, and that elements 89 will properly support the mulch paper to prevent damage to it during insertion of different size plants, each of the plates 89' comprises an inner member 110 fixed to one of the links of chain 90 and a spring compressed member 111 (Figs. 15 and 16). Member 111 is substantially U-shaped in cross-section to receive within it the inner member 110 as shown in Fig. 16. A compression spring 112 normally holds the member 111 in its extended position inwardly radially of the supporting element 89 as a whole. Member 111 is slidably retained on the inner member 110 by a pair of rivets or bolts 113 fixed in member 111 and passing through an elongated slot 114 in member 110, the slot 114 limiting the movement of member 111.

When the members 111 of the auxiliary mulch paper supporting elements 89 are extended inwardly, the opening through which the butt of a plant may be inserted is at a minimum so that the mulch paper will be adequately supported when small plants are being planted. When larger plants are inserted and locked in the mulch paper, the members 111 of supporting elements 89 will yield in order to accommodate the larger butts of such plants. Consequently, within practical size ranges of plants, elements 89 will support the mulch paper so that it does not rip or collapse but forms the plant locking tongues and flares 39 referred to hereinbefore in connection more particularly with the use of the corrugated board type of mulch paper. Thus, by using a yielding support element of this sort, the conventional, thin, flexible mulch paper 31' can be made to fit tightly around plants of various sizes with the tongues or flares 39 projecting downwardly and locking with the coarse rosette leaves of the pinapple plant to hold it firmly in place in the mulch paper which carries the plants supported in this manner down to the ground and deposits their butt ends in the ground where they are covered with soil beneath the mulch paper by the covering drags 72 as hereinbefore described. The basic operations of setting the plants in the mulch paper at a position on the planting machine above the ground as the machine is drawn across a planting field, and then carrying the plants by means of the mulch paper down to and depositing them on the ground, are exactly the same whether the heavy, less flexible corrugated mulch board is used or whether the conventional, thin, flexible mulch paper is employed.

As in the first apparatus disclosed herein, the horizontal deck portion 14' is provided with means for adjusting the depth to which the plants are inserted through the mulch paper 31' and, therefore, the depth that they are planted in the soil. Thus, the channel 95 is provided with a false bottom 120 extending along its length, and supporting pins 121 are threaded upwardly through the base of channel 95 for adjusting the position of the false bottom 120 with respect to the mulch paper 31' as has already been described.

In order to reduce the possibility of the conventional mulch paper collapsing or tearing and ripping as it carries the plants to the ground, it may be desirable to incline the entire length of the supporting deck or platform 4 in a straight line to the ground, rather than to have the portion where the plants are inserted into the mulch paper disposed horizontally with the remainder of the deck sloping as shown and described herein. While this has the disadvantage of making the portion where the plants are preset in the paper uneven in height, it has definite advantages particularly in maintaining the paper taut at all times so that it does not collapse into the trough in the deck when carrying the plants.

It will of course be readily understood that the young plants to be deposited in the ground can be inserted into the planting sheet or mulch paper automatically by machine as well as by hand and that such modification of the embodiments of the invention specifically disclosed herein is clearly within the scope of the invention as defined in the appended claims. This and other changes and modifications in the apparatus and method disclosed herein do not depart from the principles of the invention and are intended to come within the claims.

What is claimed is:

1. A planting machine comprising, in combination, a frame structure capable of being moved along the ground, a supply of relatively thin bendable sheet-material carried by said frame structure, means for guiding said sheet-material in a predetermined path from said supply to the ground and for depositing it flat on the ground, said guide means including an elongated platform mounted on and extending longitudinally of said frame structure for supporting said sheet-material along its path, with its lateral dimension substantially parallel to the ground, said sheet-material supporting platform providing a plant pre-setting station spaced above the ground and at least a portion of said supporting platform extending downwardly and rearwardly to the ground, said supporting platform having an opening at said plant pre-setting station in its upwardly facing supporting surface for accommodating the bases of plants which are inserted downwardly substantially perpendicularly through, and locked into, said sheet as it passes said plant pre-setting station.

2. A planting machine as set forth in claim 1, which further includes perforating means for forming plant receiving and locking apertures at regular intervals in said sheet-material, said perforating means being mounted on said frame structure intermediate said supply of sheet-material and said plant pre-setting station, and means for driving said perforating means while the planting machine is moved along the ground.

3. A planting machine as set forth in claim 2, wherein said plant receiving and locking apertures are smaller than the diameter of the bases of the plants, each plant forming downwardly extending locking flares in the sheet-material around each aperture as it is thrust into the sheet-material on the supporting platform, thereby causing the plants to be firmly held by the sheet-material as it is lowered to and deposited on the ground.

4. A planting machine as set forth in claim 1, wherein said opening in said platform comprises a trough extending longitudinally of said platform and which further includes a member disposed in said trough for determining the depth to which the plants are inserted into the sheet-material.

5. A planting machine as set forth in claim 1, which further includes a drag-plate adjacent the lower end of said platform for guiding the base of each plant into a furrow in the ground as it leaves said platform and for filling in soil around the plant base under the sheet-material, said drag-plate comprising an inclined portion adapted to receive the base of the plant as it leaves the lower end of said platform and a substantially horizontal portion extending rearwardly of said inclined portion, the horizontal portion being open centrally thereof for the passage of the base of each plant into the furrow, and mutually inclined members extending downwardly from said horizontal portion on opposite sides of said central opening for moving the soil on either side of the furrow into the furrow around the base of the plant.

6. Planting apparatus comprising in combination, a frame structure capable of being drawn along the ground, a roll of mulch sheet carried by said frame structure, means for guiding said mulch sheet in a predetermined path from said roll toward the rear of said apparatus to the ground where the leading end thereof is fixed to the ground, the mulch sheet being capable of being paid out from said roll as the apparatus moves forwardly along the ground; said guiding means including an elongated platform mounted on and extending longitudinally of said frame structure for supporting said mulch sheet along its path with its lateral dimension substantially parallel to the ground, said mulch sheet supporting platform providing a plant pre-setting station spaced above the ground and at least a portion of said supporting platform extending downwardly and rearwardly to the ground; perforating means mounted on said frame structure intermediate said roll of mulch sheet and said pre-setting station for forming plant receiving and locking apertures at regular intervals in said mulch sheet; said supporting platform having a depression at said plant pre-setting station in its upwardly facing supporting surface for accommodating the bases of plants which are inserted downwardly substantially perpendicularly through said sheet and locked in said apertures as said mulch sheet passes said pre-setting station; and drag-means adjacent the lower end of said platform for guiding the base of each plant into a furrow in the ground as the plants are carried by said mulch sheet onto the ground and for filling soil in around the base of each plant under the mulch sheet as it is laid.

7. Apparatus as defined in claim 6, wherein said mulch sheet is a semi-rigid corrugated paper board.

8. Apparatus as defined in claim 6, wherein said depression in said mulch sheet supporting platform comprises a portion of a trough extending the full length of said platform, said trough being provided with a bottom along at least the plant pre-setting portion thereof, said bottom comprising a plate member adjustably mounted in said trough for increasing and decreasing the depth to which the bases of the plants can be inserted through said mulch sheet into said trough.

9. Pineapple planting apparatus comprising in combination, a frame structure capable of being drawn along the ground, a roll of relatively flexible mulch sheet, such as the conventional thin pineapple mulch sheet, carried by said frame structure, means for guiding said mulch sheet in a predetermined path from said roll to the ground rearwardly of said roll where the leading end thereof is fixed to the ground, the mulch sheet being capable of being paid out from said roll as the apparatus moves forwardly along the ground; said guiding means including an elongated platform mounted on and extending longitudinally of said frame structure for supporting said mulch sheet along its path with its lateral dimension substantially parallel to the ground, said mulch sheet supporting platform providing a plant pre-setting station spaced above the ground and at least a portion of said supporting platform extending downwardly and rearwardly to the ground; a trough located in and extending longitudinally of said platform being provided to accommodate the base of the plants which are inserted downwardly substantially perpendicularly through, and locked in, said mulch sheet as it passes said pre-setting station; and auxiliary mulch sheet supporting means mounted for movement in said trough rearwardly with the mulch sheet and at the same rate at which the mulch sheet is paid out, said auxiliary supporting means comprising laterally resilient plate members forming openings at regular intervals along said trough through which the bases of the plants will snugly fit.

10. Pineapple planting apparatus as set forth in claim 9, which further includes perforating means mounted on said frame structure intermediate said roll of mulch sheet and said plant pre-setting station for forming plant receiving and locking apertures at regular intervals in said mulch sheet, the intervals between the openings in said auxiliary support means and between the apertures in said mulch sheet being equal and said auxiliary supporting means and perforating means being synchronized so that said openings and apertures are in vertical alignment with each other, whereby said flexible mulch sheet is firmly supported below by said plate members of said auxiliary supporting means when a pineapple plant is inserted through each aperture in the mulch paper into said openings so that downwardly extending tight fitting flares or tongues are formed in the sheet around each plant, said flares or tongues interlocking with the lower leaves of the plant to hold it firmly in said mulch sheet.

11. Pineapple planting apparatus as set forth in claim 10, which further includes a furrowing plow mounted on said frame forwardly of the point where said mulch sheet contacts the ground, and a drag-plate adjacent the lower end of said platform for guiding the base of each plant into a furrow formed by said plow and for filling in soil around the plant base under the mulch sheet, said drag-plate comprising an inclined portion adapted to receive the base of the plant as it leaves the lower end of said platform and a substantially horizontal portion extending rearwardly of said inclined portion, the horizontal portion being open centrally thereof for the passage of the base of each plant into the furrow, and mutually inclined members extending downwardly from said horizontal portion on opposite sides of said central opening for moving the soil on either side of the furrow into the furrow around the base of the plant.

12. A planting machine comprising, in combination, a frame structure capable of being moved along the ground, a supply of relatively thin bendable sheet-material carried by said frame, means for guiding said sheet-material in a predetermined path from said supply to the ground and for placing it flat on the ground, a furrowing plow mounted on said frame forwardly of the point where the sheet-material engages the ground for plowing a furrow in the soil; said guide means including an elongated platform mounted on and extending longitudinally of said frame for supporting said sheet-material along its path, said sheet-material supporting platform providing a plant pre-setting station spaced above the ground with at least a portion of said supporting platform extending downwardly and rearwardly from said station to the ground; perforating means mounted on said frame intermediate said supply of sheet-material and said plant pre-setting station for forming plant receiving apertures at regular intervals in said sheet-material; said supporting platform having an opening at said pre-setting station in its upwardly facing supporting surface for accommodating the bases of plants which are inserted downwardly substantially perpendicularly through and locked into, said sheet as it passes said plant pre-setting station.

13. A planting machine comprising, in combination, a frame structure capable of being moved along the ground, a supply of relatively thin bendable sheet-material carried by said frame structure, means for guiding said sheet-material in a predetermined path from said supply to the ground and for depositing it flat on the ground, said guide means including an elongated platform mounted on and extending longitudinally of said frame structure for supporting said sheet-material along its path with its lateral dimension substantially parallel to the ground, said sheet-material supporting platform providing a plant pre-setting station spaced above the ground and having at said station an opening in its upwardly facing supporting surface for accommodating the bases of plants which are inserted downwardly substantially perpendicularly through, and locked into, said sheet as it passes said pre-setting station.

References Cited in the file of this patent

UNITED STATES PATENTS

| | | |
|---|---|---|
| 1,895,962 | Bateman et al. | Jan. 31, 1933 |
| 2,465,227 | Heatley | Mar. 22, 1949 |
| 2,514,890 | McLemore | July 11, 1950 |
| 2,708,812 | Nakai | May 24, 1955 |
| 2,718,856 | Gathercoal | Sept. 27, 1955 |
| 2,749,855 | Guigas | June 12, 1956 |
| 2,800,865 | Gathercoal | July 30, 1957 |

FOREIGN PATENTS

| | | |
|---|---|---|
| 74,703 | Austria | Sept. 25, 1918 |

UNITED STATES PATENT OFFICE
CERTIFICATE OF CORRECTION

Patent No. 2,890,665                                                  June 16, 1959

Lawrence S. C. Kang

It is hereby certified that error appears in the printed specification of the above numbered patent requiring correction and that the said Letters Patent should read as corrected below.

Column 4, line 36, for "much" read -- mulch --; column 7, line 33, after "size" and before the period, insert -- of plant --; line 61, for "volts" read -- bolts --; column 8, line 33, for "covered" read -- curved --; line 58, for "depening" read -- depending --; column 11, line 6, for "for an" read -- or an --.

Signed and sealed this 3rd day of November 1959.

(SEAL)
Attest:

KARL H. AXLINE
Attesting Officer

ROBERT C. WATSON
                                                               Commissioner of Patents